March 13, 1928.
A. M. LEONI ET AL
1,662,386
CONTROLLER FOR ELECTRIC VEHICLES
Filed June 27, 1925
7 Sheets-Sheet 1
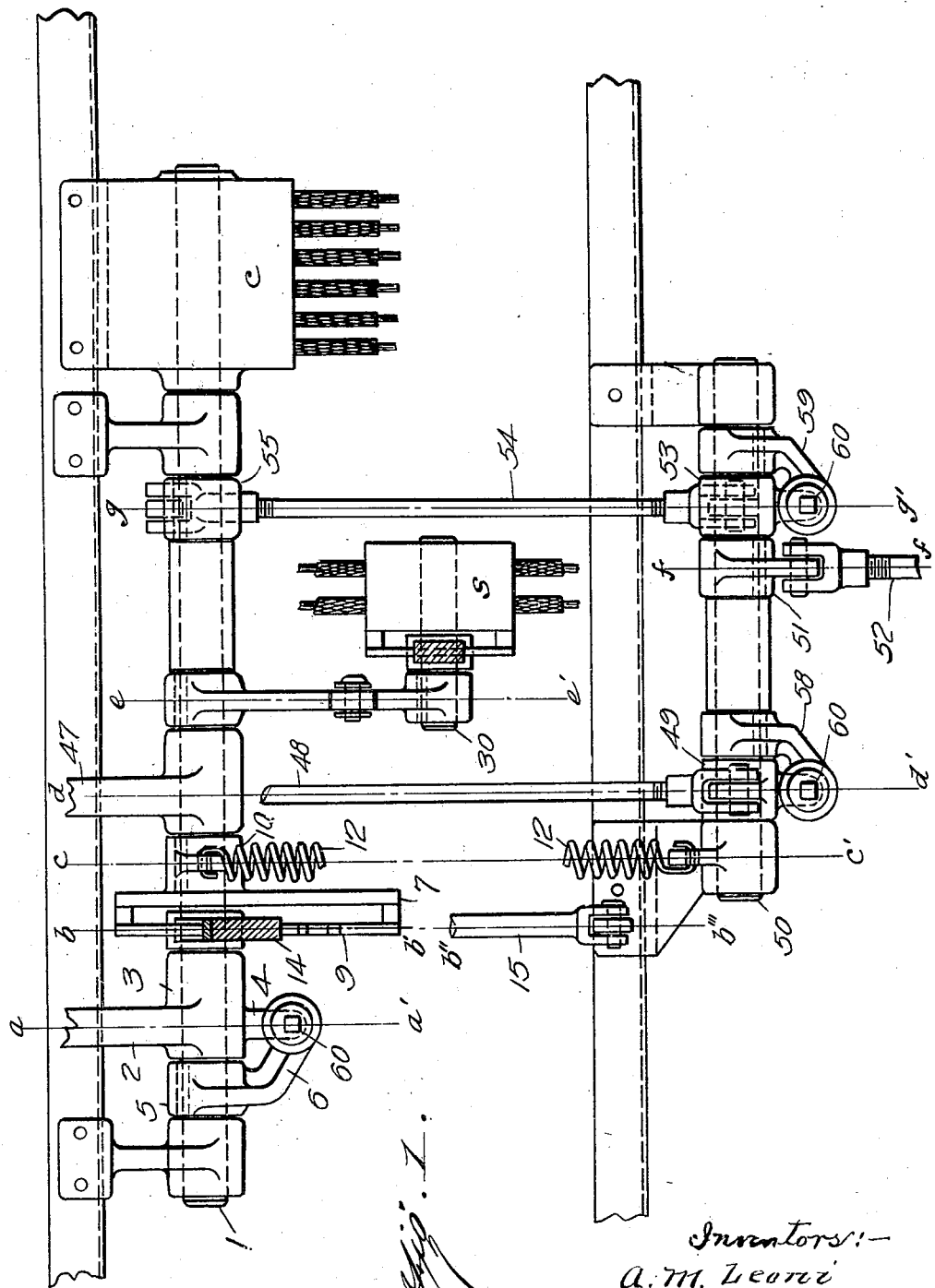

March 13, 1928.
A. M. LEONI ET AL
1,662,386
CONTROLLER FOR ELECTRIC VEHICLES
Filed June 27, 1925    7 Sheets-Sheet 2
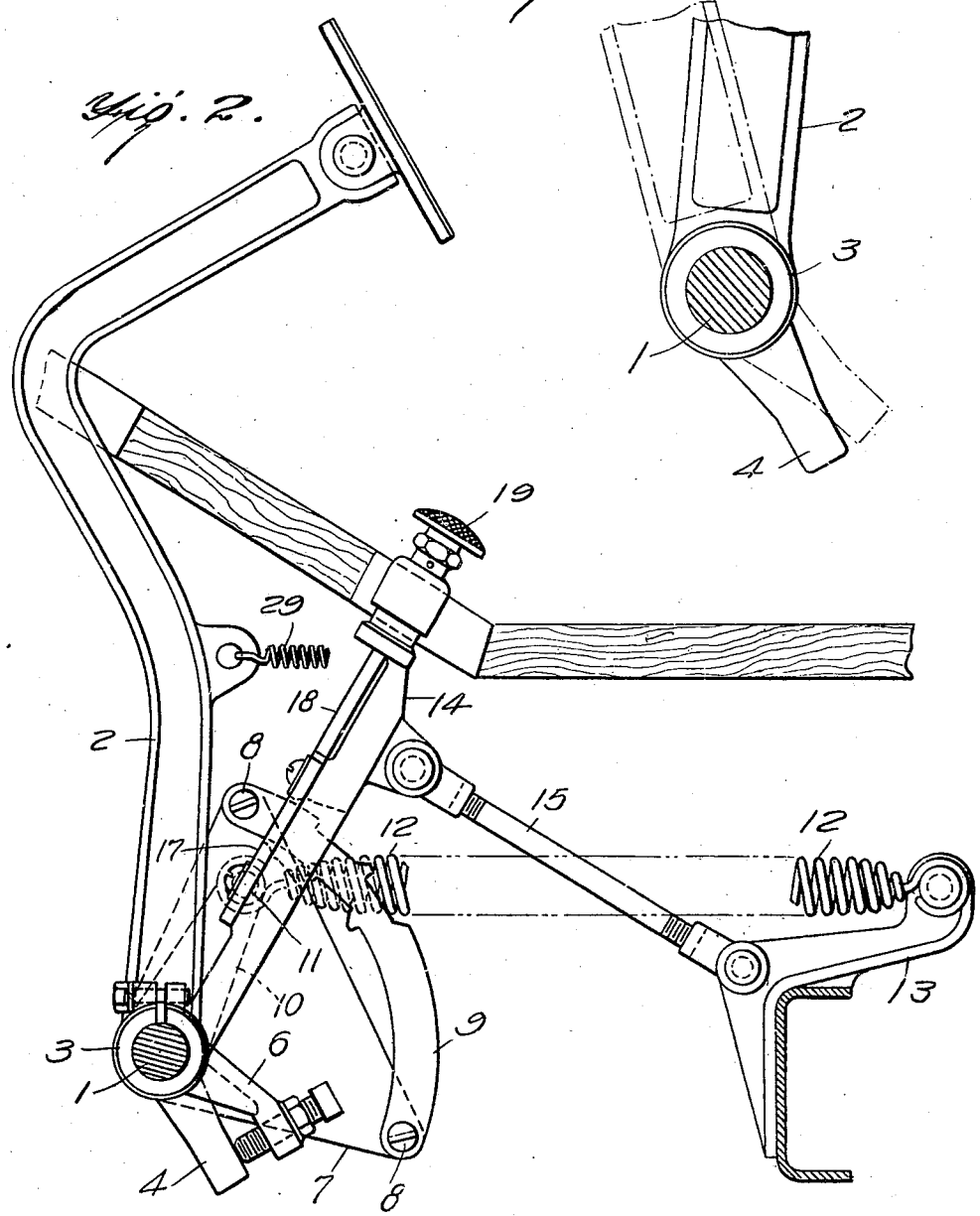
Inventors,
A. M. LEONI,
A. H. ASPROOTH,
By Jack Richmond
Attorney

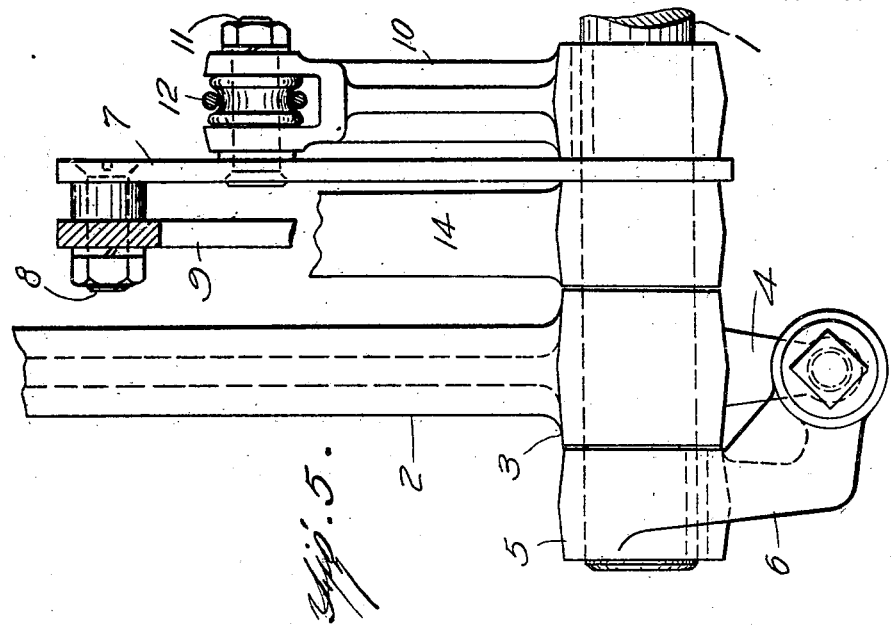
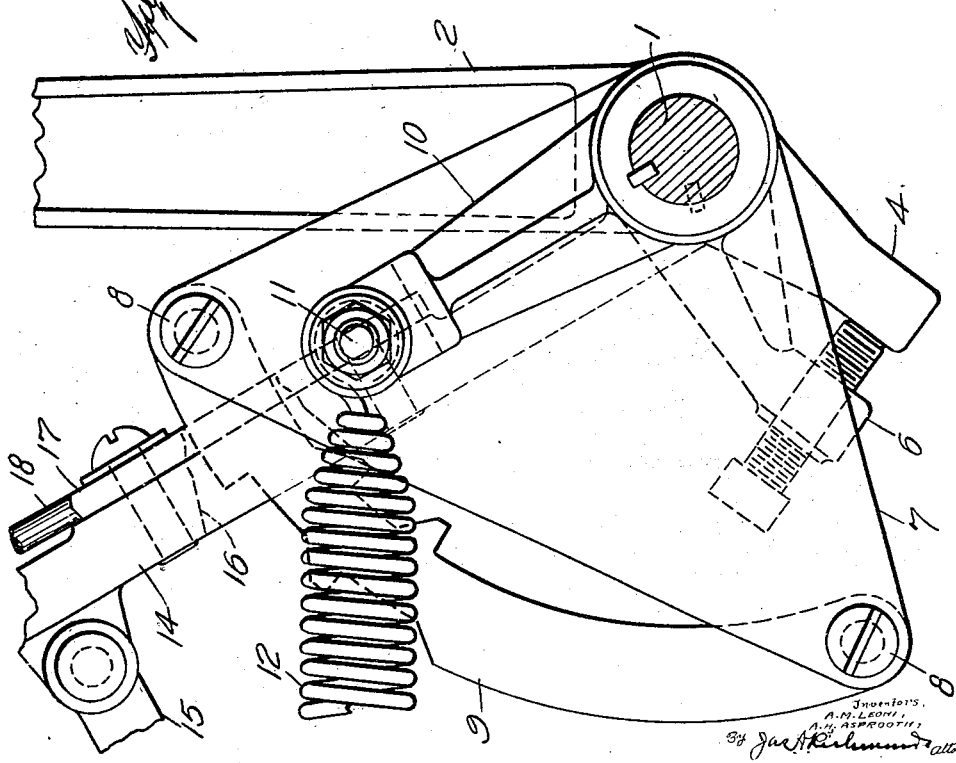

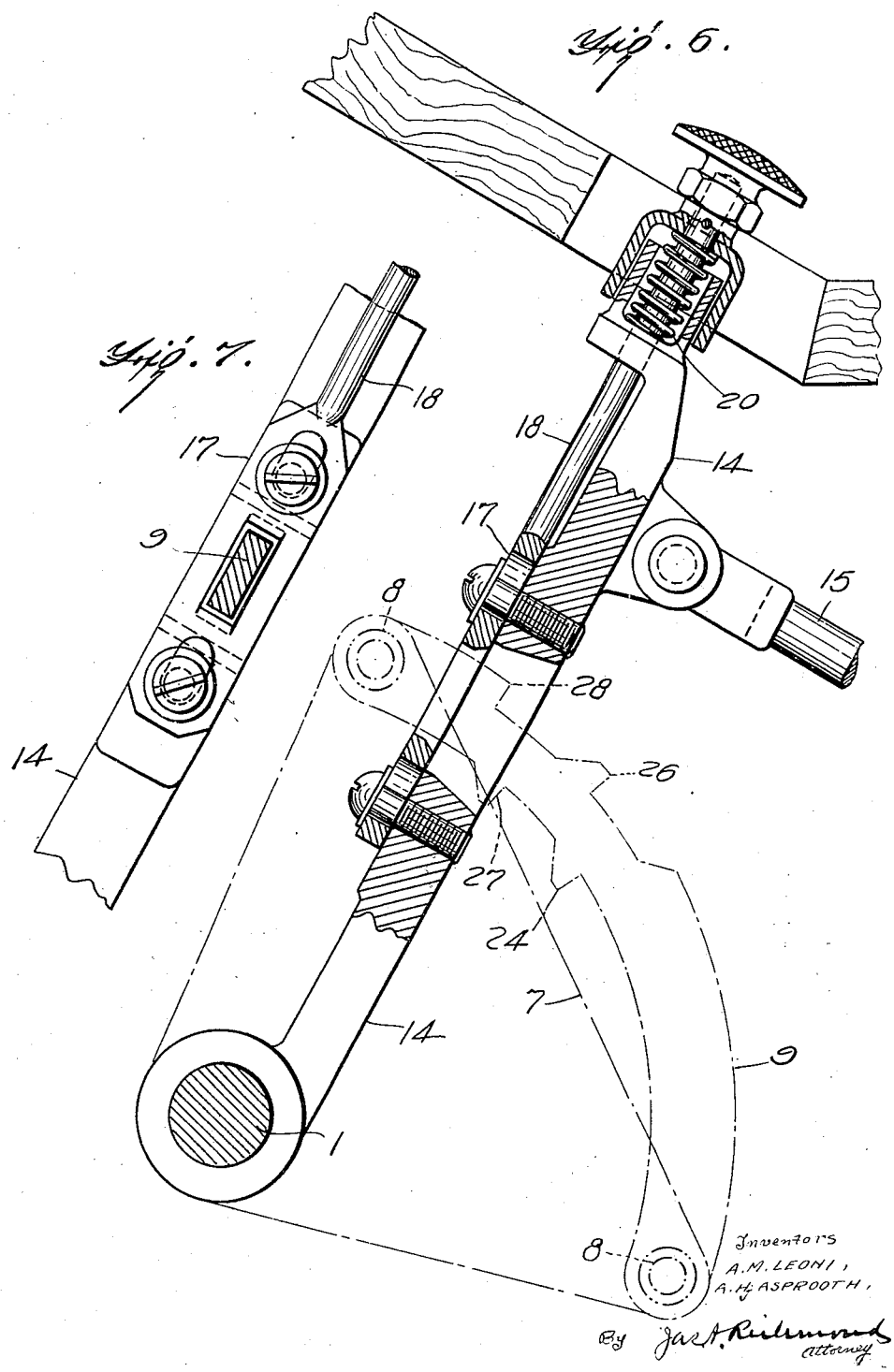

March 13, 1928.
A. M. LEONI ET AL
1,662,386
CONTROLLER FOR ELECTRIC VEHICLES
Filed June 27, 1925
7 Sheets-Sheet 5
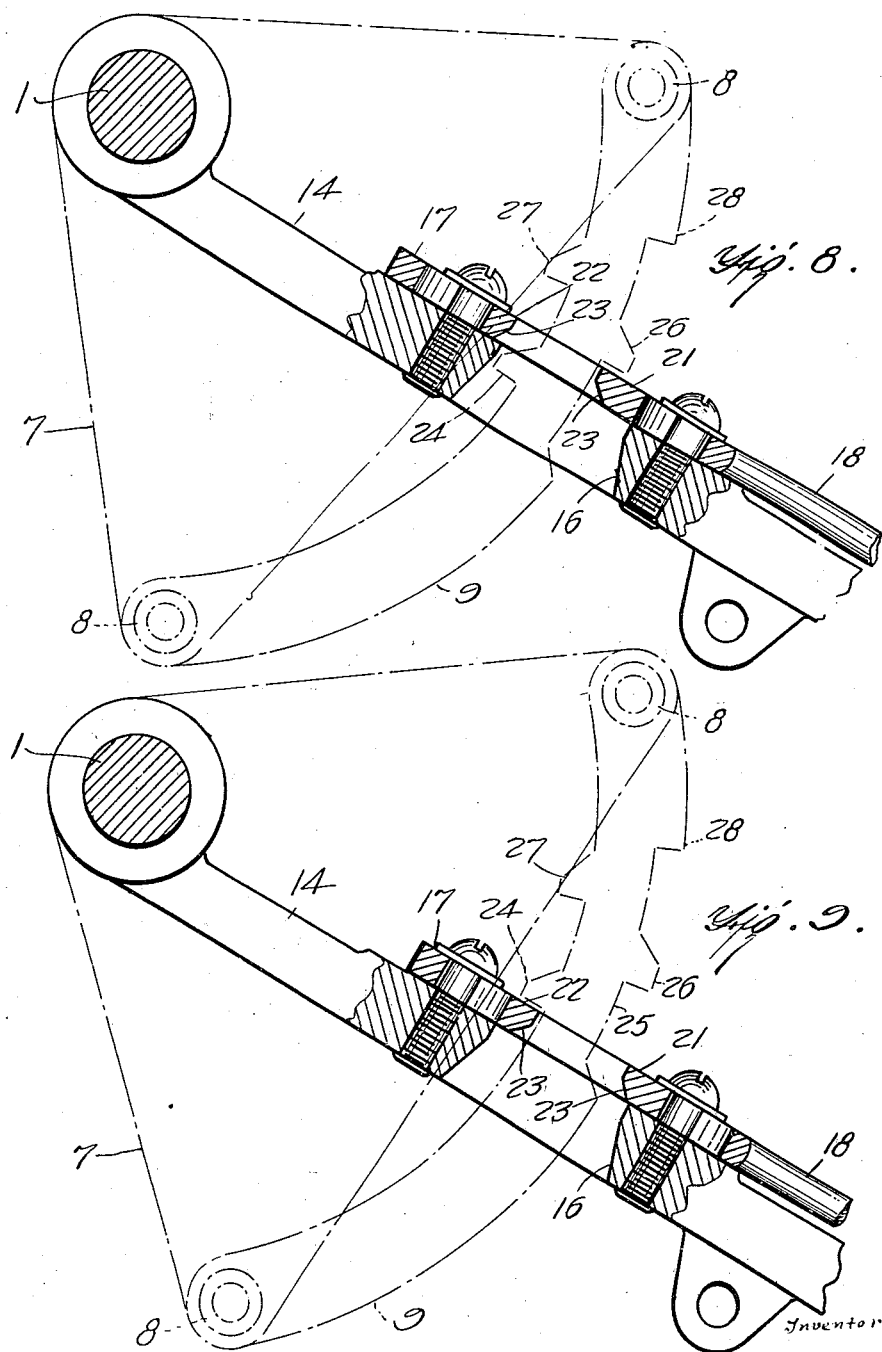

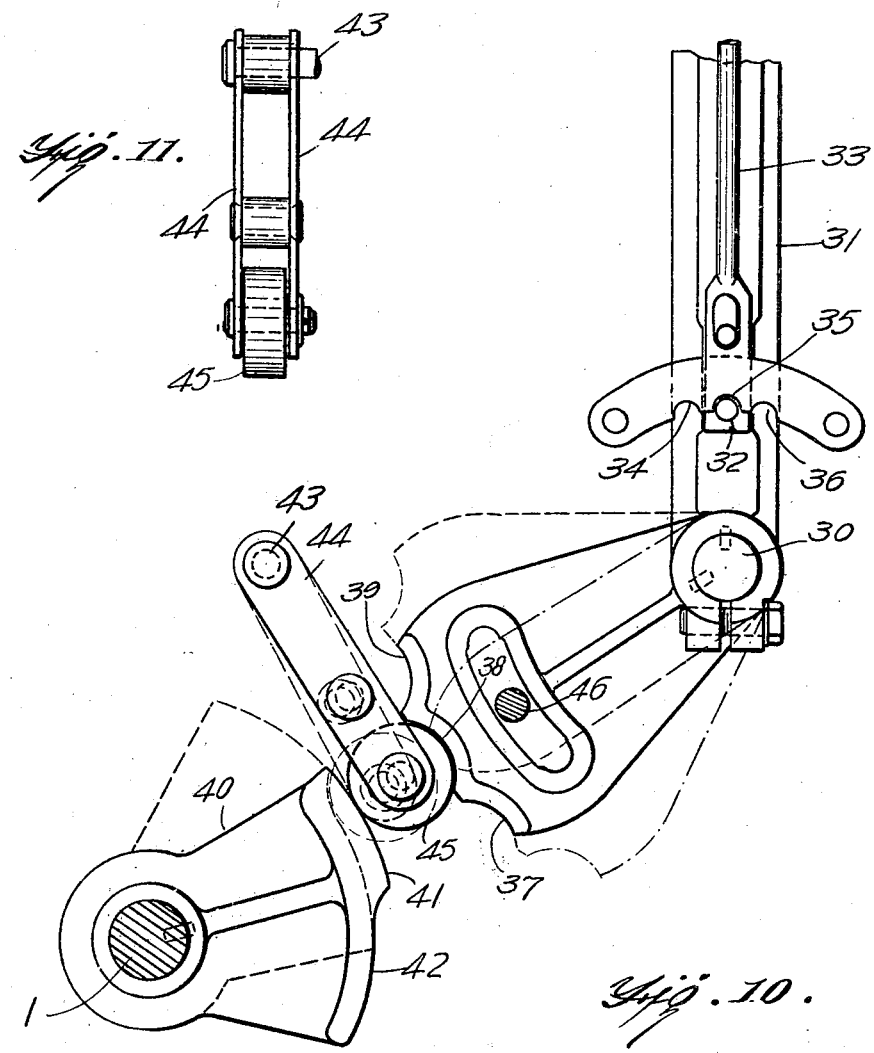

March 13, 1928.
A. M. LEONI ET AL
1,662,386
CONTROLLER FOR ELECTRIC VEHICLES
Filed June 27, 1925    7 Sheets-Sheet 7
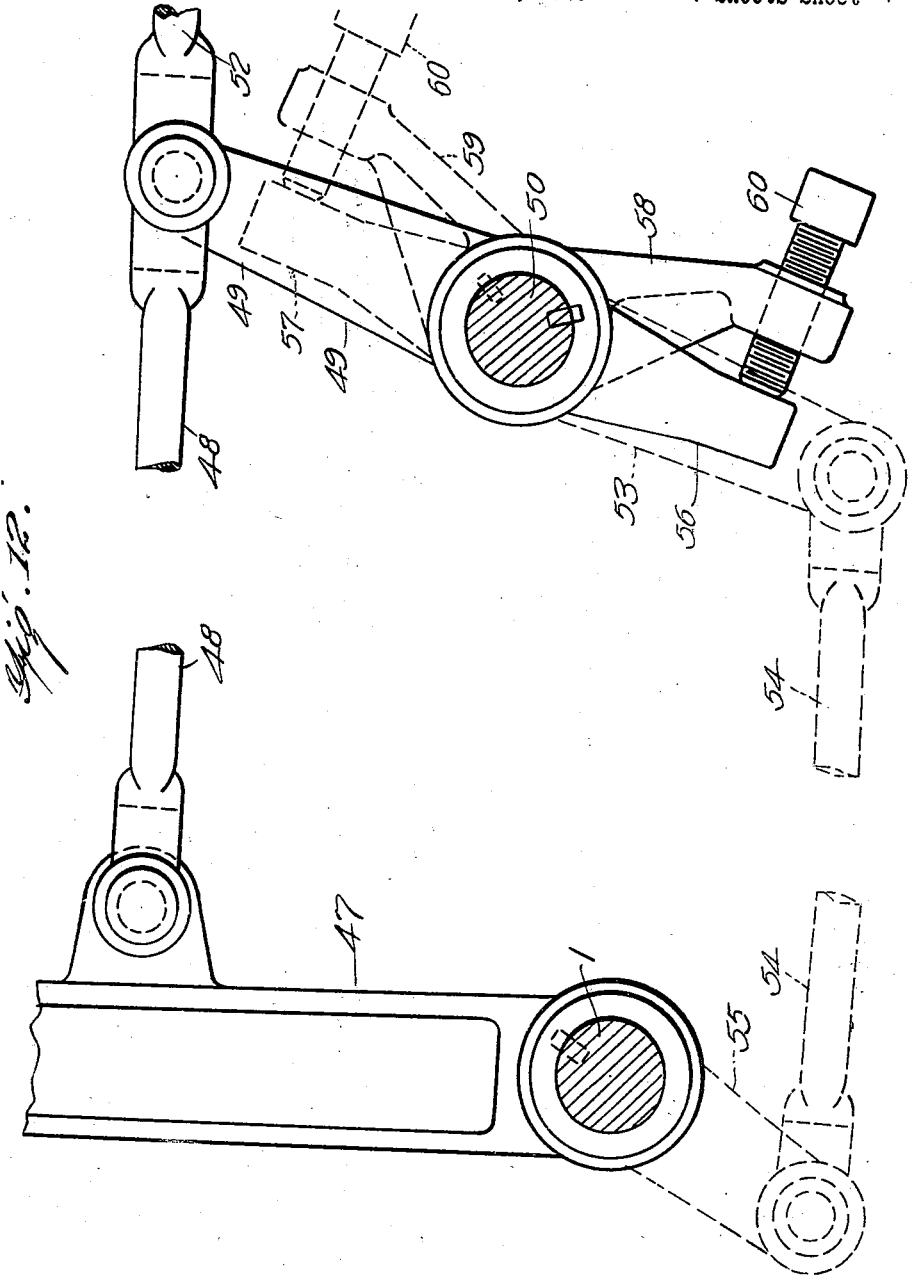
Inventors,
A. M. LEONI,
A. H. ASPROOTH,
By Jack A. Richmond
Attorney Patented Mar. 13, 1928.

1,662,386

UNITED STATES PATENT OFFICE.

ALFONSO M. LEONI, OF PHILADELPHIA, PENNSYLVANIA, AND AXEL HJ. ASPROOTH, OF BALTIMORE, MARYLAND, ASSIGNORS TO ELECTRO-MOTIVE DEVICES, INC., OF PHILADELPHIA, PENNSYLVANIA, A CORPORATION OF NEW JERSEY.

CONTROLLER FOR ELECTRIC VEHICLES.

Application filed June 27, 1925. Serial No. 40,077.

The invention is directed to a control system for electrically driven vehicles, wherein the instrumentalities for the speed selection, the primary switches, and the braking mechanism, are so coordinated and interlocked, one with another, as to preclude, either accidentally or intentionally, an operation which might prove detrimental to the further efficiency or working life of the operating parts.

In motor vehicles, particularly of the electrically-driven type, the usual possibility of applying the brakes while the current is on is a normal condition to be properly governed only by the intelligence and care of the operator. At best the braking while the current is on the driving motors will occasionally occur with the most experienced and careful operators, and the resultant damage and wear to the parts materially shortens their life and efficiency.

Moreover, the ordinary current controller for electric vehicles embodies the electrical contacts for the governing of the motor, which contacts are operated under current in accordance with speed positions. It is highly desirable that these contacts be separated and embodied into an independent primary switch, so interlocked with the current controller as to become operative only when the controller is in neutral or no current position.

The present invention is designed therefore to so coordinate and interlock the various operations necessary to the control of the vehicle, that, entirely beyond the permissive control of the operator, the speed selective mechanism may be successively stepped from neutral to maximum speed or returned to neutral through manual manipulation; that while the speed selective mechanism is in other than the neutral position the primary switch cannot be selectively or otherwise operated; and that the braking mechanism will, as a prerequisite to its braking function, automatically return the speed selective mechanism to a neutral position, that is to a position of no current on the driving motors.

It is a characteristic feature of the present invention that the interlocking relations of the various operating mechanisms are entirely automatic, requiring no unusual manipulation or action on the part of the operator, function entirely without his attention, and cannot, without a complete dismantling or separation of the parts, fail of a responsive control in the particulars required.

The speed control is progressive at the will of the operator, and through the controls provided speed operation to the required degree may be provided and maintained. The braking mechanism is also controlled through the usual manual adjuncts, being in this case, however, so interconnected with the speed control as to insure the return of such control to neutral in and during the initial brake-applying movement of the manually-operated part therefor. The primary switch or switches are also provided with means for interlocking same against movement as long as the speed control is in other than neutral position.

The invention in the preferred form of details is illustrated in the accompanying drawings, in which:—

Fig. 1 is a plan view of the control mechanism assembly.

Fig. 2 is a view in side elevation, partly in section of the speed control.

Fig. 3 is a sectional view through the control shaft, showing the mounting and connection of the speed-control foot pedal.

Figs. 4 and 5 are side and front elevations, respectively, showing more particularly the means for operating the speed-control quadrant.

Figs. 6 and 7 are side elevations and front elevations, respectively, of the means for controlling the step-by-step movements of the speed control quadrant.

Fig. 8 is a veiw in side elevation, partly in section, showing the manner of locking the speed-control quadrant in selected position.

Fig. 9 is a similar view, with the quadrant locked in another position.

Fig. 10 is a view in side elevation showing the means for locking the primary switch.

Fig. 11 is a front elevation of the locking member of the primary switch lock.

Fig. 12 is a view in side elevation, partly in section showing the mounting of the brake pedal for operating the brakes and the automatic control of the speed governing means in the operation of such brake pedal.

The detail of the present invention will, by preference, be described under groupings of the selective controls for the speed changes; the primary switch; the service braking mechanism; and the emergency braking mechanism, the interlocking relations of the particular controls being referred to in connection with that control. It is to be understood that the invention is not concerned with any electrical units, circuits, or similar details; nor with any particular type of brake details, and where reference to such is made herein, any conventional or preferred type of such is to be understood as included.

*The speed selective control.*

This control, as illustrated in Figs. 2 to 6, inclusive, is designed to permit the operator to select the desired speed of the vehicle, or hold the control neutral, that is without current on the driving motors. This control comprises a control shaft 1, designed to operate a proper electrical unit whereby, according to the position of such shaft, current for the selected speed, or no-current flow, will be permitted to reach the driving motors. A foot pedal 2 is mounted on but capable of free rotation relative to the control shaft, the pedal sleeve 3 encircling the shaft 1 having a depending arm 4. An operating sleeve 5 is keyed on shaft 1 adjacent sleeve 3, and is provided with an extension 6, terminally lying in rear of the end of arm 4, and provided with a set screw for adjusting the extent of movement of the shaft 1 under action of the pedal 2 and the contact of the arm 4 with the extension 6. A quadrant frame 7 is mounted freely on the shaft 1, and through lateral bolts 8, carries a quadrant 9 at one side of the frame. A lever 10 is keyed on shaft 1, and is terminally provided with a lateral bolt 11 extending through the frame 7. A spring 12, anchored at one end to a frame bar of the vehicle frame, or to a bracket secured thereon, as 13, is connected at the opposite end to the bolt 11, thus influencing the quadrant and shaft 1 in one direction, that is, as will later appear, in the direction of speed increase movement of the shaft.

Intermediate the mountings of the frame 7 and pedal 2 on the shaft 1, a guide frame bar 14 is arranged, this frame bar 14 being free on the shaft, extended to and through the floor board of the vehicle, and held by a brace 15 extended to the bracket 13. The guide frame bar 14 is formed with a slot 16 through which the quadrant 9 extends and operates. A double pawl 17 is slidably mounted on the frame bar 14, forming the lower portion of a rod 18 extending through the upper end of the frame bar 14, and provided with a foot button 19. A spring 20 acts to normally hold the rod and therefore the double pawl in its uppermost position, though permitting convenient manual depression of the parts when desired. The double pawl comprises a plate slotted for the passage of the quadrant therethrough, with the upper and lower edges forming the upper and lower engaging edges, or pawls 21 and 22. These pawls present a rear or inclined guiding edge 23, for a purpose later apparent.

The upper bar of the quadrant 9 is formed in its upper and lower edges with relatively offset notches or projections to define the limit movements of the quadrant in the various speed positions of the control shaft 1. For this purpose the lower edge of the quadrant bar is formed with a rearmost projection 24, the forward edge of which is inclined, this being the limit position of the quadrant bar when the control shaft 1 is in no-current or neutral position. The upper edge of the quadrant bar is formed with a recess 25, terminating in a projection 26, with the forward edge inclined, the projection 26 being in advance of the projection 24, this projection 26 defining the limit position of the quadrant when the control shaft 1 is in first-speed position. Similarly, the lower and upper edges of the quadrant are formed with other projections, here indicated as 27 and 28, progressively advanced relative to the other projections, and defining respectively the second-speed and third-speed positions of the control shaft. Obviously these limiting positions are determined by the pawls 21 and 22, the former cooperating with the upper projections 26 and 28, and the latter with the projections 24 and 27. The quadrant is under tension from the spring 12, and as pressure is exerted on the foot button 19, the pawls may be operated to permit the quadrant and thereby the control shaft to advance from neutral position through the successive speeds until the desired speed is reached. Of course, any movement of the pawl plate to displace one pawl relative to the quadrant projections will position the other pawl for engagement, hence the movement of the quadrant is necessarily a step by step movement.

The foot pedal 2 is loose on the control shaft, as described, and hence the speed-control movement of the quadrant is without any effect on the foot pedal. However, this foot pedal, through the arm 4 engaging and actuating the extension 6, which latter is fixed to the control shaft, may obviously actuate the control shaft in a direction to return the quadrant through successively diminished speed positions to the neutral position. This action again loads the spring 12, for subsequent operation of the quadrant, and places the speed operation entirely within the control of the driver, as is absolutely necessary for proper operation of the vehicle. A spring 29 holds the foot pedal in normal position, and the inclined forward edges of the pawl projections on the quadrant serve to automatically displace the respective pawls as the foot pedal is operated.

The operator may, by the construction described select any desired speed, and move the control shaft to a position to permit that speed through the appropriate electrical unit (not shown), simply through manipulation of the foot button 19, and then return to any desired speed or to neutral through operation of the foot pedal 2, the latter being wholly unaffected except when manually operated.

*The primary switch control.*

The primary switch through which the current is controlled for direct drive, reverse drive, or no-current or neutral position, and its interlocking cooperation in the control system of this invention, is best shown in Figs. 10 and 11. The switch shaft 30, through which the switch proper (S, Fig. 1) is controlled, is to be operated by a hand lever 31, having the usual locking dog 32, controlled by finger rod 33, and cooperating with direct, neutral, and reverse position notches 34, 35, and 36, in a sector. The switch shaft 30 is provided with a radially projecting locking plate having edge concavities 37, 38, and 39, arranged respectively at the same angles to the center of the switch shaft as are the notches 34, 35, and 36. A cam plate 40 is keyed on the control shaft 1, with its free edge adjacent to but spaced from the formed edge of the locking plate. This free edge of the cam plate has a profile presenting a locking portion 41 and a relief portion 42, both concentric with the cam axis, with the relief portion of less radius than the locking portion.

An interlocking member is pivotally supported on an idler shaft 43, and comprises spaced interconnected bars 44, between which at the free end is arranged a roller 45. The interlocking member is so disposed that the roller plays between the cam plate 40 and the locking plate, and is of such diameter that when resting on the locking portion 41 of the cam plate it will be forced into the adjacent concavity 37, 38, or 39 of the locking plate, under which circumstances the locking plate, and hence the switch shaft, cannot be operated. When the relief portion 42 of the cam plate is opposite the roller 45, the latter moves by gravity from the plane of the concavities in the locking plate, and the latter is free, and the switch shaft can be operated by the hand lever for the control of the primary switch.

The cam plate is keyed on the control shaft 1, and hence is moved when such control shaft is moved. The locking portion of the cam plate is so designed that when the control shaft 1, through speed control movement of the quadrant, as previously described, has been moved to any speed position, such cam-plate locking portion is operative to hold the roller in one of the concavities of the locking plate. When the control shaft 1 is in position of no current, or neutral, the relief portion of the cam-plate is opposite the roller, and the locking plate is free. The extreme positions of the locking plate are checked by a pin 46.

The primary switch is thus arranged for the usual manual control, but is locked against control movement as long as any current is flowing to the drive motors, that is when the control shaft has been moved to any speed position; such primary switch being only capable of operation when the control shaft is in no-current or neutral position.

*The brake control.*

The brake control and its interlocking cooperation in the control system of the present invention is best shown in Figs. 12, 13, and 14 of the drawings. This detail of the invention is in no wise concerned with the particular type of brakes, nor in the direct method of their application, so long as they are responsive to the operation of the usual brake pedal. This brake control is to be interlocked with the speed control shaft 1, so that in any attempted application of the brakes, the control shaft will be operated to return the parts to a position of no-current or neutral, so that a prerequisite to brake application is a condition of no current in the driving motors. Thus current is saved and the strain and undue wear of the parts incident to the application of the brakes, while the motors are under drive, is avoided. Of course the cooperation between the braking action and the neutral position of the speed control must be entirely automatic, in order that the result may be secured merely in the operation of applying the brakes in the usual manner.

The braking mechanism is operated through the usual brake pedal 47, mounted for the convenience of the driver, and connected through the medium of a rod 48 to an arm 49, loose on a countershaft 50, hereinafter termed the brake shaft. Another arm 51, keyed on the brake shaft, is connected by a rod 52 to the equalizer or other appropriate element of the brakes, so that on turning the brake shaft the brakes are set.

An operating arm 53 similar to arm 49 is loose on the brake shaft, being connected by a rod 54 to an arm 55 keyed on the control shaft 1. The arms 49 and 53 extend normally in opposite directions from the brake shaft, and are each provided with integral extensions 56 and 57, respectively, which project beyond the brake shaft as prolongations of the arms. Secured on the brake shaft adjacent each of the arms 49 and 53 are collars having lever extensions 58 and 59, terminally disposed in the operative planes of the extensions 56 and 57, respectively, set screws 60 being carried by the lever extensions for adjustable control of the engagement.

The arms 49 and 53 are thus loose on the brake shaft and if moved in one direction, that is in a direction to move their extensions away from the adjacent lever extensions, the brake shaft will not be operated. The arrangement is such that when the control shaft is moved for speed control, as hereinbefore described, the arm 55 is moved with such control shaft in the rearward direction, similarly swinging the arm 53 on the brake shaft, but as this movement carries the extension 57 of such arm 53 away from the adjacent lever extension 59, the brake shaft will not be operated and the brakes will remain unaffected. The return toward neutral or neutral position of the control shaft 1, through operation of the pedal 2, will merely restore the arm 53 and its extension 57 to normal position. Thus with the construction described the speed control may be operated in any desired manner without in any way affecting the brakes, assuming the latter free of application.

In applying the brakes, the pedal 47 is operated, swinging the arm 49 forwardly, and causing its extension 56 to contact with the adjacent lever extension 58, and, as the latter is keyed to the brake shaft, operate such shaft and set the brakes. On the initiation of this braking movement, the turning of the brake shaft will operate the lever extension 59 in the forward direction, exerting pressure on the lever extension 57 of arm 53, and causing the movement of the latter to operate arm 55 through rod 54, and thus turn the control shaft 1 in a direction and to an extent to place the speed control in neutral or no-current position. Thus the brakes cannot be applied while the current is on the driving motors, as the initial application of the braking mechanism forces the speed control to a neutral position.

The interlocking operation is entirely automatic, requires no independent operation on the part of the driver, and yet positively prevents the application of the brakes while the current is on the driving motors.

*The intercontrol system.*

From the above it will be plain that the system of the present invention is directed to the inter-relation and interlocking of the conventional and commercial systems for the control of an electrically driven motor vehicle, in that undue wear, waste of power and reduced efficiency may be avoided. The important characteristic is the provision of means whereby when the brakes are applied the power is cut off, entirely without the permissive selection of the operator, and the further fact that the primary switch is locked in the particular position incident to the then operation of the vehicle, by the speed control; that is when such speed control is in any position other than neutral the primary switch cannot be operated.

The system is entirely automatic, requires no direct operative attention on the part of the operator, cannot be tampered with, short of direct disconnection or mutilation, and requires no operative knowledge other than that necessary for ordinary motor vehicle operation. The simplicity of the interconnecting parts, their entire absence of function when not required for operation, and the complete independence of the respective controls in their necessary and usual functions renders the system readily applicable to any conventional controls for vehicles of this type.

Having thus described the invention, what is claimed as new, is:—

1. An intercontrol system for electrically driven vehicles having a speed control and a brake control, comprising means for automatically maintaining the speed control at neutral position during brake application.

2. An intercontrol system for electrically driven vehicles having a speed control and a brake control, comprising means for operating the speed control to a neutral position in the brake application.

3. An intercontrol system for electrically driven vehicles, including an independently-operable speed control, and a brake control designed to neutralize the speed control when operated to set the brakes.

4. An intercontrol system for electrically driven vehicles, including a progressive speed control, means for automatically actuating such control in advancing speed direction, and a pedal for returning such speed control toward and to neutral, the pedal being unaffected by the automatic movement of the speed control.

5. An intercontrol system for electrically driven vehicles, a primary switch, a speed control, and means for locking out the primary switch when the speed control is in a position other than neutral.

6. An intercontrol system for electrically driven vehicles, comprising a speed control, a primary switch, and a brake control, and an interconnected control between the speed control, the primary switch, and the brake control, whereby the primary switch and brake control are incapable of operation with the speed control in other than a predetermined position.

7. An intercontrol system for electrically driven vehicles, comprising a speed control, a primary switch, and a brake control, said parts being interrelated to prevent operation of the primary switch and brake control with the speed control in other than a neutral position.

8. In a control system for electrically driven vehicles, a speed control shaft, a member for determining speed governing positions of such shaft, a spring for progressively operating such member, and a manually-operable control for determining the extent of movement of such member under the influence of said spring.

9. In a control system for electrically driven vehicles, a speed control shaft, a pedal normally free of influence on said shaft, an automatically actuated member connected to said shaft for determining respective speed positions of the shaft, a manually controlled element for limiting movement of said member, and means whereby the pedal may operate the shaft in speed reduction movement at will.

10. In a control system for electrically driven vehicles, a speed control shaft, a notched quadrant connected to the shaft for determining speed positions thereof, a manually-operable pawl for limiting the positions of the quadrant, a spring for operating the quadrant progressively through increasing speed positions, and a manually operable member for operating the shaft through speed reducing progression at will.

11. In a control system for electrically driven vehicles, a speed control shaft, a spring-operated notched quadrant connected to the shaft for determining the speed control positions thereof, a manually operable pawl for engaging the notches of the quadrant to limit the position thereof, and a pedal unaffected by speed advance movement of the shaft and capable of moving the shaft through speed reduction progression at will.

12. In a control system for electrically driven vehicles, a speed control shaft, means to control the movement of said shaft progressively through speed-increasing movements, a primary switch capable of several positions for current control, and means whereby any speed indicating position of the speed control shaft will lock the primary switch in its then position.

13. In a control system for electrically driven vehicles, a speed control shaft, means for automatically operating said shaft progressively through speed increasing movements, a primary switch capable of several positions for current control, a locking plate movable with the primary switch, and means cooperating with the locking plate and controlled by the movement of the speed control shaft to hold the locking plate and thereby the primary switch against movement in all speed-indicating positions of such shaft.

14. In a control system for electrically driven vehicles, a speed control shaft movable from neutral progressively through speed increasing positions, a primary switch for current control having forward, neutral, and reverse positions, and means for locking the primary switch in any one of such positions when the speed control shaft is in other than neutral position.

15. In a speed control system for electrically driven vehicles, a speed control shaft movable from neutral progressively through speed increasing positions, a primary switch for current control having forward, neutral, and reverse positions, a locking plate movable with the primary switch and having a plurality of locking recesses, a member cooperating with the recesses to hold the plate and thereby the primary switch against movement, and means movable with the speed control shaft for holding said member in locking cooperation with one of said recesses in all positions of such speed control shaft other than the neutral position.

16. In a control system for electrically driven vehicles, a speed shaft movable from neutral progressively through speed increasing positions, a primary current control switch having forward, neutral, and reverse positions, a locking plate movable with the primary switch and formed with edge recesses, a roller cooperating with the recesses to hold the locking plate and thereby the primary switch against movement, and a cam plate operable in the movement of the speed control shaft and formed to hold the roller in the adjacent recess of the locking plate in all speed positions of the control shaft.

17. In a control system for electrically driven vehicles, a speed control shaft operable from neutral to maximum speed, a primary switch having forward, neutral, and reverse current positions, a notched locking plate carried by and movable with the primary switch, a roller having locking cooperation with any one of said notches, a cam plate movable in the operation of the speed control shaft and formed to hold the roller in locking cooperation with the particular notch in all speed indicating positions of the speed control shaft, said cam plate being formed to free the roller relative to the engaged notch when the speed control shaft is in neutral position.

18. In a control system for electrically driven vehicles, a speed control shaft operative progressively through successive speeds, a brake control, and means whereby the operation of the brake control simultaneously operates the speed control shaft through successive speed reductions to neutral.

19. In an intercontrol system for electrically driven vehicles, a speed control shaft operative progressively through successive speeds, a brake control, and means for moving the speed control shaft to neutral position in the operation of the brake control, the speed control shaft being independently operable at will.

20. In an intercontrol system for electrically driven vehicles, a speed control mechanism, a brake control mechanism, means interconnecting such mechanisms to compel a neutral position of the speed control mechanism in the operation of the brake control mechanism.

21. In an intercontrol system for electrically driven vehicles, a speed control mechanism, a brake control mechanism, and means whereby operation of the brake control mechanism will compel an operation of the speed control mechanism in any position of such speed control mechanism other than neutral.

22. In an intercontrol system for electrically driven vehicles, a speed control shaft operative to different speed positions, a brake control mechanism, and a connection between said brake control mechanism and said speed control shaft to operate the latter to a predetermined position in the operation of the brake control mechanism.

23. In an intercontrol system for electrically driven vehicles, a speed control shaft, means for operating the shaft progressively from neutral to maximum speed position, a braking mechanism, and means for operating said shaft to neutral position in the operation of the braking mechanism.

24. In an intercontrol system for electrically driven vehicles, a speed control shaft operative to different speed positions, a counter shaft, a manually operative element free on said shaft, means whereby movement of said element in one direction will operate the counter shaft, brake operating means operated in the movement of the countershaft, and a connection between said countershaft and the speed control shaft to compel a movement of the speed control shaft in the brake operating movement of the counter shaft.

25. In an intercontrol system for electrically driven vehicles, a speed control shaft, a counter shaft, braking mechanism operated in the movement of the countershaft, lever extensions projecting from and secured to the countershaft, a manually operated arm freely movable on the countershaft and adapted to engage one of said lever extensions in movement of the arm in one direction, a second arm freely movable on said countershaft and adapted to be engaged and operated by the other of such lever extensions in the braking movement of the counter shaft, and a connection between such second arm and the speed control shaft to compel a movement of such control shaft in the braking movement of the countershaft.

26. In an intercontrol system for electrically driven vehicles, a speed control shaft, a countershaft connected to the brakes, means for operating the countershaft for operating the brakes, and means operated by the countershaft for compelling a predetermined movement of the control shaft.

27. In an intercontrol system for electrically driven vehicles, a speed shaft operative progressively from neutral through successively increasing speeds, a countershaft operative to set the brakes, means for operating the countershaft, and a connection between the countershaft and control shaft to compel a movement of the latter from any speed indicating position to a neutral position in that movement of the countershaft acting to set the brakes.

28. In an intercontrol system for electrically driven vehicles, a speed control shaft movable for progressive speed indications from neutral to maximum speed, a countershaft, a connection therefrom to the brakes, and means between the countershaft and speed control shaft to cause a brake operating movement of the countershaft to operate the speed control shaft in a speed reducing direction, said means being unaffected by the countershaft when the speed control shaft is in neutral position.

29. In an intercontrol system for electrically driven vehicles, a speed control shaft, a countershaft connected to the brakes, independent arms mounted for free movement on the countershaft, a manually operable member connected to one of said arms, a connection between the other of said arms and the speed control shaft, and means carried by the countershaft whereby movement of the first mentioned arm is communicated to the countershaft, and means on the shaft whereby movement of the countershaft is communicated to the second mentioned arm.

30. In an intercontrol system for electrically driven vehicles, a speed control shaft, a countershaft connected to the brakes, a manually operable arm mounted for free movement on the countershaft, a second arm mounted for free movement on the countershaft, a connection between said second arm and the speed control shaft, an extension lever secured on the countershaft and adapted to be engaged and operated by the first mentioned arm, and a second extension lever secured on the countershaft and adapted to engage and operate the second arm in the movement of the countershaft, whereby the operative movement of the countershaft is communicated to the speed control shaft.

31. In an intercontrol system for electrically driven vehicles, a speed control shaft operative for progressive speed control from neutral to maximum, a countershaft connected to the brakes, and means intermediate the countershaft and speed control shaft to compel a brake-operating movement of the countershaft to move the speed control shaft to neutral position.

32. In an intercontrol system for electrically driven vehicles, a speed control shaft operative from neutral to maximum positions, a countershaft connected to the brakes, and means intermediate the countershaft and speed control shaft to compel a brake-operating movement of the countershaft to move the speed control shaft to neutral position, said speed control shaft being operative at will without affecting the countershaft.

33. In an intercontrol system for electrically driven vehicles, a speed control shaft automatically operative in speed-increasing direction and manually operative in speed reducing direction, a countershaft connected to the brakes, and means between the countershaft and speed control shaft to compel a speed reducing movement of the speed control shaft in any brake setting movement of the countershaft.

34. In an intercontrol system for electrically driven vehicles, means governed in any speed advancing movement of such vehicle to prevent change in primary current control, with such speed advacing movement neutralized in brake application.

35. In an intercontrol system for electrically driven vehicles, a speed control directly locking the primary current control in any position of such speed control other than neutral, with braking mechanism which in operation compels a neutral position of such speed control.

36. An electrically driven vehicle having a speed control, a primary switch, and a braking mechanism, means whereby the operation of the speed control will lock the primary switch against operation, and means whereby the operation of the braking mechanism will compel a neutral position of the speed control.

37. An electrically driven vehicle having a speed control automatically operated in speed increasing direction and manually operated in speed decreasing direction, a primary switch, and a braking mechanism, means serving to prevent operation of the primary switch when the speed control is in other than a predetermined position, and means operative in the actuation of the braking mechanism to manually operate the speed control.

38. An electrically driven vehicle having a speed control automatically operable from neutral to maximum and manually operable from maximum to neutral, of braking mechanism serving when actuated to manually operate the speed control toward and to neutral position.

39. An electrically driven vehicle having a speed control, a primary switch, and a braking mechanism, of means for preventing operation of the primary switch when the speed control is in other than a neutral position, and means serving when the braking mechanism is operated to operate the speed control to a neutral position.

40. An electrically driven vehicle having a speed control, a primary switch, and a braking mechanism, and means directly controlled by the speed control to prevent operation of the primary switch or braking mechanism when the said speed control is in other than a neutral position.

41. An electrically driven vehicle having means to govern the application of the power to vary the speeds of the vehicle, and means to prevent reversal of the current application or the application of the brakes while the vehicle is under power.

42. An electrically driven vehicle having a speed control independently responsive to manual operation, a primary switch responsive to manual control only when the speed control is in a position of no speed, and a braking mechanism capable of permissive operation in corelation to the speed control, said speed control being directly operated by the braking mechanism to a no-speed position in any actuation of such braking mechanism.

43. An electrically driven vehicle having a speed control automatically progressive and manually retractive, a reverse switch interlocked with the speed control in all speed positions of the latter, and braking mechanism operatively interlocked with the speed control in all speed positions of the latter.

44. An electrically driven vehicle having speed control, braking means capable of permissive operation, means whereby the operation of the braking means will compel a no-speed position of the speed control, said means permitting operation of the speed control without affecting the braking means.

45. An electrically driven vehicle having a speed control progressively operative from neutral to maximum, and braking mechanism operatively connected to the speed control in any other than neutral position to compel a movement of such speed control.

46. An electrically driven vehicle having a speed control which is automatically progressive and manually retractive, a power reverse switch locked against power control in all speed positions of the speed control, and a braking mechanism which is unaffected in any movement of the speed control and which when actuated serves to compel a no-speed position of such speed control without regard to the previous speed indicating position of such speed control.

47. An electrically driven vehicle, a speed control, manual means for permitting automatic operation of said speed control progressively, a manually operable member to compel a retractive movement of such speed control toward and to neutral, and braking mechanism acting independently of such manually operable member to compel a retractive movement of such speed control to a neutral position.

In testimony whereof we affix our signatures.

ALFONSO M. LEONI.
AXEL HJ. ASPROOTH.